UNITED STATES PATENT OFFICE.

WILLIAM T. ASHBY, OF BLOOMFIELD, NEW JERSEY.

PROCESS OF MANUFACTURING OLEOMARGARIN.

1,400,341.  Specification of Letters Patent.  Patented Dec. 13, 1921.

No Drawing.   Application filed August 24, 1920. Serial No. 405,714.

*To all whom it may concern:*

Be it known that I, WILLIAM T. ASHBY, a citizen of the United States, and a resident of Bloomfield, in the county of Essex and State of New Jersey, have invented new and useful Improvements in Processes of Manufacturing Oleomargarin, of which the following is a specification.

This invention relates to a process of producing a butter substitute or oleomargarin or margarin, as it is various termed or known in different places.

The objects of the invention are to provide an improved process whereby a superior quality of oleomargarin is produced with a saving of milk, whey or other flavoring medium and salt, and with a saving of labor and expense by simplifying the operation and reducing the space required for carrying it out; to produce an emulsion of the fatty and aqueous ingredients which is stable at the emulsifying temperature and in fluid form; to thus avoid the crystallizing heretofore required; to enable the ingredients to be used in the proportions in which they are desired in the finished product, and thus avoid working to remove the surplus; to enable the mixture to be tempered in a homogeneous state, preferably as a fluid, and to enable the mixture to be packaged in fluid form, and to obtain other advantages and results as may be brought out by the following description:

In carrying out my process the method of procedure may be varied somewhat according to the desires of the manufacturer and the materials and quantity and quality thereof which are used in the production of the oleomargarin. In one course of procedure I first prepare the milk, whey or other suitable flavoring material to be used into a working condition in the usual way, after which I mix the fats or oils which are to be used *e. g.* cocoanut oil, oleo oil, neutral lard, etc., and bring them to the desired working temperature which will vary according to the results desired and the proportions of the different oils or fats used by a conventional method. Any suitable proportions may be used *e. g.* 80% fats or oils and 20% flavoring medium. The flavoring medium and the fats or oils are then mixed and the necessary quantity of salt added. The mixture is then passed into any one of the conventional types of emulsifying machines or so-called homogenizers, such as the centrifugal machine or the pressure machine, where the ingredients are broken up into an infinite number of minute globules held in suspension which are intimately mixed and the flavoring medium thoroughly distributed throughout the mixture. The mixture is then passed into a holding receptacle where the "conditioning" or "tempering" takes place under suitable temperatures varying from 65° to 70° F. for a period of time varying from 18 to 36 hours according to the kinds of fats and the proportions thereof used, the mixture being retained in the holding receptacle until the desired flavor has developed. The tempering of the mixture is begun with the mixture in a liquid or semi-liquid state, and is continued until the mixture has developed the desired flavor and consistency. From the holding receptacle the product is then transferred to a suitable filling device from which it is placed in suitable packages, when the product is ready for shipping and marketing.

As a specific example of my process of preparing oleomargarin in which I use cocoanut oil and milk in proportions of substantially 80% of cocoanut oil and 20% of milk, I first pasteurize the milk at any temperature sufficient for pasteurization and then cool the same to approximately 68° F., adding 1% of lactic acid culture. The milk is then thoroughly stirred and allowed to stand until the desired acidity has developed which is approximately seven tenths of one per cent. I then prepare the cocoanut oil and bring it to a temperature slightly above the melting point thereof, and combine the cocoanut oil with the milk in a receptacle where the mixture is thoroughly stirred. After stirring, the mixture is passed through the emulsifying machine, the outlet of which is connected with a closed vat to receive the mixture as it passes through the machine. The mixture is allowed to stand in said vat for substantially 24 hours at a temperature of substantially 70° F. Then the desired quantity of salt is added and the mixture agitated to thoroughly mix the salt therethrough after which the product is ready for packaging and marketing.

In some instances I may omit the addition of the salt to the mixture until it has been passed through the emulsifier and then add the salt, subsequently agitating the mixture to thoroughly distribute the salt, and then package the product. I have also found that it is sometimes preferable to mix the salt with either the flavoring medium or fat before they are mixed, and then pass the flavoring medium and fats into the emulsifier separately where the mixing of the flavoring medium and fat takes place. Where, as above stated, the flavoring medium and fat are passed into the emulsifier separately, I may omit the salt until after the mixture of the fat and flavoring medium is completed in the emulsifier and add the salt after the mixture has been removed from the emulsifier. The addition of the salt at these different times depends upon the particular quality of oleomargarin desired, and in some cases the salt may be omitted altogether.

It is also possible to condition or temper the oleomargarin in the packages, thus eliminating the use of the holding receptacle, and where this procedure is followed the packages after receiving the oleomargarin are stored for the required time and at the necessary temperature until the desired flavor has developed.

By the use of my process less flavoring medium and salt are required and superior and more constant results are obtained than by the use of the present known processes; and the cost of manufacture of oleomargarin is reduced. These results are secured because I obtain an emulsion which is stable, as stated, and therefore does not have to be crystallized. It can be tempered without any change of form at all, if desired, and in any event in a homogeneous state, preferably as a fluid. This not only insures perfect distribution of the flavoring, but also enables the same to be conserved, in that the milk and the salt can be used in the proportions in which they are desired in the product. Furthermore, the mixture in a fluid state can be handled to great advantage, and if desired can be run in that form into molds or packages and solidified there.

Having thus described the invention, what I claim is:

1. A process of making oleomargarin, which consists in mechanically producing an emulsion of the fatty and aqueous ingredients which is stable at substantially the emulsifying temperature, whereby no chilling is required, and tempering the same.

2. A process of making oleomargarin, which consists in mechanically producing an emulsion of the fatty and aqueous ingredients which is stable in fluid form, and tempering the same.

3. A process of making oleomargarin, which consists in mechanically producing a substantially stable emulsion of the fatty and aqueous ingredients in the proportions desired in the oleomargarin, whereby no working is required, and tempering the same.

4. A process of making oleomargarin, which consists in producing a substantially stable emulsion of the fatty and aqueous ingredients, and tempering the same in a homogeneous state.

5. A process of making oleomargarin, which consists in producing an emulsion of the fatty and aqueous ingredients, and tempering the same in stable fluid form.

6. A process of making oleomargarin, which consists in producing an emulsion of the fatty and aqueous ingredients, tempering the same in fluid form, and solidifying it.

7. A process of making oleomargarin, which consists in producing an emulsion of the fatty and aqueous ingredients, tempering the same, running it in fluid form into molds, and solidifying.

WILLIAM T. ASHBY.